United States Patent [19]

Moinas et al.

[11] 3,895,123

[45] July 15, 1975

[54] CHEESE FLAVOURING

[75] Inventors: Michel Moinas, Vevey; Michel John Arthur Groux, Lauperswil; Ian Horman, Corseaux, all of Switzerland

[73] Assignee: Societe d'Assistance Technique pour Produits Nestle S.A., Lausanne, Switzerland

[22] Filed: Dec. 18, 1973

[21] Appl. No.: 425,724

[30] Foreign Application Priority Data

Dec. 28, 1972 Switzerland.................... 18994/72

[52] U.S. Cl. ................................................ 426/534
[51] Int. Cl.................................................. A23l 1/26
[58] Field of Search................................ 426/65, 175

[56] References Cited
UNITED STATES PATENTS
3,520,699  7/1970  Henning................................. 426/65
FOREIGN PATENTS OR APPLICATIONS
7,204,791  10/1972  Netherlands........................ 426/65

*Primary Examiner*—Joseph M. Golian
*Attorney, Agent, or Firm*—Watson Leavenworth Kelton & Taggart

[57] ABSTRACT

A composition for imparting a cheese flavour comprises (i) 0.5 to 15 parts by weight of 2-heptanone, (ii) 7 to 26 parts by weight of 2-nonanone, the total of the amounts of 2-heptanone and 2-nonanone present being between 15 and 27 parts by weight and the amount of 2-nonanone being at least equal to the amount of 2-heptanone, (iii) at least one of 2-heptanol and 2-nonanol, in a total amount of 12 to 22 parts by weight, (iv) 0.2 to 1.5 parts by weight of phenol, (v) 22 to 90 parts by weight of butyric acid, (vi) 1 to 6 parts by weight of 1-octen-3-ol, and (vii) 0.3 to 3.0 parts by weight of methyl cinnamate. By varying the amounts of 1-octen-3-ol and methyl cinnamate a Camembert or a blue cheese flavour is obtained.

20 Claims, No Drawings

CHEESE FLAVOURING

The present invention is concerned with cheese flavouring compositions.

Various compositions have been proposed for imparting a cheese flavour to food products, such as spreads, sauces or processed cheese. In general, these compositions contain substances whose presence in the aroma of cheese has been revealed by analytical means. Examples of such substances are certain methyl ketones such as 2-pentanone, 2-heptanone, 2-nonanone, fatty acids such as octanoic (caprylic) acid or butyric acid, certain lactones, and also phenol. However, these compositions whilst including a substantial number of constituents, generally only provide an aromatic note that is hardly specific, that is to say a note which is merely "cheese-like" and not representative of the characteristic flavour of a particular cheese.

The present invention is concerned with a flavouring agent of simple chemical composition and having a flavour which, depending on the respective quantities of specific constituents, particularly well reproduces that of a Camembert-type or blue-veined cheese. The present invention provides a composition for imparting the flavour of Camembert-type or blue-veined cheese to foodstuffs, comprising (i) 0.5 to 15 parts by weight of 2-heptanone, (ii) 7 to 26 parts by weight of 2-nonanone, the total of the amounts of 2-heptanone and 2-nonanone present being between 15 and 27 parts by weight and the amount of 2-nonanone being at least equal to the amount of 2-heptanone, (iii) at least one of 2-heptanol and 2-nonanol, in a total amount of 12 to 22 parts by weight, (iv) 0.2 to 1.5 parts by weight of phenol, (v) 22 to 90 parts by weight of butyric acid, (vi) 1 to 6 parts by weight of 1octen-3-ol, and (vii) 0.3 to 3.0 parts by weight of methyl cinnamate.

1-octen-3-ol and methyl cinnamate, the presence of which in the flavour of cheese has not previously been detected, are constituents which play a decisive role in the composition in accordance with the invention. Thus, the organoleptic tests carried out, which are described in detail hereinafter, have shown that a composition which only contains known substances conventionally used for preparing cheese flavouring agents, namely 2-heptanone, 2-nonanone, 2-heptanol and/or 2-nonanol, phenol and butyric acid only imparts an indefinite, unspecific cheese flavour to food products, such as processed cheese of neutral taste. By contrast, incorporation of 1-octen-3-ol and methyl cinnamate in this composition in combination with the known substances, provides a flavouring agent which imparts a very specific flavour analogous to that of a Camembert-type of blue-veined cheese. The nature of the flavour obtained, that is to say the analogy with the flavour of Camembert cheese or blue-veined cheese, is a specific function of the amount of 1-octen-3-ol and methyl cinnamate present. Thus, it has been observed that if the amount of 1-octen-3-ol used is small, that is to say less than 3 parts by weight, a flavour analogous to that of blue-veined cheese is obtained, irrespective of the amount of methyl cinnamate (within the stated limits) present.

On the other hand, if the amount of 1-octen-3-ol is greater, that is to say of the order of 3 to 6 parts by weight, a Camembert flavour is obtained when the amount of methyl cinnamate is small, that is to say of the order of 0.3 to 1 part by weight, and a blue flavour is obtained with cinnamate contents above 1 and up to 3 parts by weight.

Although it is not essential, the composition in accordance with the invention may contain, in addition to 2-heptanone and 2-nonanone, other methyl ketones such as 2-pentanone or 2-undecanone in amounts of the order of 0.5 to 2% of the total weight of the composition.

2-heptanol and 2-nonanol may be present individually, but the composition preferably contains both these alcohols in a total amount of 12 to 22 parts by weight, for example 9.5 parts of 2-heptanol and 5.2 parts by weight of 2-nonanol.

The appropriate amount of butyric acid may be selected within a very wide range of between 40 to 66% of the total weight of the composition, corresponding to 22 to 90 parts by weight.

The composition according to the invention may be prepared very simply, as by mixing the liquid constituents (2-heptanone, 2-nonanone, secondary alcohol(s), butyric acid and 1-octen-3-ol) in the above-specified proportions, and dissolving the solid constituents (phenol and methyl cinnamate) in the liquid mixture. The temperature of mixing anad of dissolution, provided that it is consistent with preserving of the stability of the constituents, is not a critical parameter in relation to these operations. These may be effected at ambient temperature or at a slightly elevated temperature of the order of 50° to 60°C, for example, in order to speed up the dissolution of the solid substances in the liquid mixture.

In accordance with a preferred variant the liquid products except the butyric acid are admixed, the solid substances are dissolved in the liquid mixture and the butyric acid is added at the end.

Preferably, the mixture is allowed to stand for some time, for example 10 to 12 hours, before incorporation in a foodstuff. The composition is a colourless, oily liquid that is sparingly soluble in water and soluble in fats. It may be kept at ambient temperature for extended periods, of the order of 12 months, without losing its flavouring power.

The perception threshold of the composition in accordance with the invention, i.e. the quantity by weight of this composition, expressed as a ratio to that of the foodstuff to which it is added, above which the flavour of Camembert-type of blue-veined cheese is detected in the foodstuff, was determined on samples of processed cheese of neutral taste containing various amounts of the flavoring composition. These samples were submitted in triangle tests to a panel of 10 trained tasters; each triangle consists of three samples, two of which are alike and the third different. Before judging quality, the taster must identify the odd sample, so as to ensure that the test is significant. A "Fontina" type cheese, ripened for one month, was used as the substrate. The cheese, after removal of rind, has a slightly acid and salty taste but without any identifiable characteristic flavour. The cheese was grated into thin slices and melted by heating at 90°C with conventional emulsifying salts (polyphosphates and pyrophosphates). The compositions in accordance with the invention described in the Examples were added by steps of 10 ppm to the melt, at a temperature of about 75°, in amounts of from 10 to 100 ppm. After cooling and solidification, ten samples of each flavoured composition were thus obtained and submitted to the panel of tasters. For each composition, the perception threshold was defined as the content of flavouring composition in the sample, expressed in ppm, at which 8 of the 10 testers first satisfied the triangle criterion and detected a Camembert-type or blue-veined cheese flavour in the sample.

The perception threshold was found to be of the order of 50 ppm for each of the tested compositions.

Organoleptic tests carried out under the same conditions for contents of flavouring composition varying between 350 and 900 ppm in steps of 50 ppm showed that the samples containing more than 500 ppm of flavouring composition displayed a disagreeable taste that was different from the desired taste.

Determination of the perception threshold for a composition containing neither 1-octen-3-ol nor methyl cinnamate but all the other constituents given above in the same amounts showed that the threshold, i.e. the content at which 8 of the 10 tasters first detected an unspecific cheese taste, is 100 ppm.

The flavouring compositions in accordance with the present invention may be incorporated in a variety of foodstuffs, including sauces, fatty emulsions such as mayonnaise, salad dressings, spreads or processed cheeses. The compositions may be incorporated directly in fat-containing food products when the products are in liquid or pasty form during the course of their manufacture or in their final form. Alternatively, the compositions may be added in solution in an edible oil or, if the foodstuff has a low fat content, as an aqueous emulsion which, for example, may be sprayed onto a powdered product.

The compositions according to the invention, which possess a high degree of flavouring power, may be added to foodstuffs at a level of 50 to 500 ppm by weight, depending on the strength of the flavour desired. In general, a level of 100 to 300 ppm is preferred. The food product thus obtained has a stable flavour of Camembert-type or blue-veined cheese the character and strength of which are maintained on storage.

The invention is illustrated by the following examples, in which the parts are expressed on a weight basis.

EXAMPLE 1

The following substances are mixed in liquid form at ambient temperature:

| | | |
|---|---|---|
| 2-Heptanone | 2 | g |
| 2-Nonanone | 45.5 | g |
| 2-Heptanol | 24.2 | g |
| 2-Nonanol | 13.2 | g |
| Phenol | 2.5 | g |

Subsequently, 2.5 g of 1-octen-3-ol and 1.75 of methyl cinnamate are dissolved in the liquid mixture, and when these substances have dissolved 158 g butyric acid are added.

0.1 g of this composition is added to 500 g of molten "Fontina"-type cheese previously described.

This cheese is then submitted to a panel of 10 tasters. Eight of these tasters considered that this cheese has the characteristic flavour of Danish blue cheese.

For comparison, samples of two processed cheeses were submitted to the panel of tasters in a triangle taste test. To the first cheese 200 ppm of the composition described at the beginning of this example are added. To the second cheese are added 200 ppm of the same composition from which the 1-octen-3-ol and methyl cinnamate have been omitted.

All 10 tasters satisfied the triangle identification criterion, and considered that the cheese flavoured with the composition not containing 1-octen-3-ol and methyl cinnamate differed markedly from the other cheese by the absence of a specific flavour.

EXAMPLE 2

A flavouring composition containing the following substances is prepared as described in Example 1 :

| | | |
|---|---|---|
| 2-Heptanone | 0.8 | parts |
| 2-Nonanone | 17.6 | |
| 2-Heptanol | 9.3 | |
| 2-Nonanol | 5.1 | |
| Phenol | 1.0 | |
| Butyric acid | 61.9 | |
| 1-Octen-3-ol | 3.9 | |
| methyl cinnamate | 0.4 | |

This composition was added to the processed cheese described previously at a level of 250 ppm. The tasters found that this cheese has a flavour analogous to that of Camembert.

EXAMPLE 3

A flavouring composition containing the following substances is prepared:

| | | |
|---|---|---|
| 2-Heptanone | 0.8 | parts |
| 2-Nonanone | 18.0 | |
| 2-Heptanol | 14.0 | |
| Phenol | 0.2 | |
| Butyric acid | 63.0 | |
| 1-Octen-3-ol | 2.0 | |
| Methyl cinnamate | 2.0 | |

This composition, when added to the processed cheese previously described at a level of 200 ppm, imparts a flavour of blue-veined cheese.

EXAMPLE 4

A flavouring composition containing the following substances is prepared :

| | | |
|---|---|---|
| 2-Heptanone | 0.7 | parts |
| 2-Nonanone | 15.4 | |
| 2-Heptanol | 8.2 | |
| 2-Nonanol | 4.5 | |
| Phenol | 0.9 | |
| Butyric acid | 65.0 | |
| 1-Octen-3-ol | 3.5 | |
| Methyl cinnamate | 1.8 | |

This composition, added to processed cheese at a level of 300 ppm, imparts a Roquefort flavour.

EXAMPLE 5

The following composition is prepared :

| | | |
|---|---|---|
| 2-Heptanone | 1.2 | parts |
| 2-Nonanone | 25.7 | |
| 2-Heptanol | 13.7 | |
| 2-Nonanol | 7.5 | |
| Phenol | 1.4 | |
| Butyric acid | 42.0 | |
| 1-Octen-3-ol | 5.7 | |
| Methyl cinnamate | 2.8 | |

This composition, added to processed cheese at a level of 280 ppm, imparts a flavour of blue-veined cheese.

EXAMPLE 6

The following composition is prepared:

| | | |
|---|---|---|
| 2-Heptanone | 13.0 | parts |
| 2-Nonanone | 13.5 | |
| 2-Heptanol | 9.6 | |
| 2-Nonanol | 4.8 | |
| Phenol | 0.5 | |
| Butyric acid | 60.8 | |
| 1-Octen-3-ol | 4.8 | |
| Methyl cinnamate | 0.6 | |

This composition, added to the processed cheese in the proportion of 180 ppm, imparts a Camembert flavour.

We claim:

1. A cheese flavouring composition comprising (i) 0.5 to 15 parts by weight of 2-heptanone, (ii) 7 to 26 parts by weight of 2-nonanone, the total of the amounts of 2-heptanone and 2-nonanone present being between 15 and 27 parts by weight and the amount of 2-nonanone being at least equal to the amount of 2-heptanone, (iii) at least one of 2-heptanol and 2-nonanol, in a total amount of 12 to 22 parts by weight, (iv) 0.2 to 1.5 parts by weight of phenol, (v) 22 to 90 parts by weight of butyric acid, (vi) 1 to 6 parts by weight of 1-octen-3-ol, and (vii) 0.3 to 3.0 parts by weight of methyl cinnamate.

2. A composition according to claim 1 containing less than 3 parts by weight of 1-octen-3-ol.

3. A composition according to claim 1 containing 3 to 6 parts by weight of 1-octen-3-ol and 1 to 3 parts by weight of methyl cinnamate.

4. A composition according to claim 1 containing 3 to 6 parts by weight of 1-octen-3-ol and 0.3 to 1 part by weight of methyl cinnamate.

5. A foodstuff containing 50 to 500 ppm by weight of a composition according to claim 1.

6. A foodstuff containing 50 to 500 ppm by weight of a composition according to claim 2.

7. A foodstuff containing 50 to 500 ppm by weight of a composition according to claim 3.

8. A foodstuff containing 50 to 500 ppm by weight of a composition according to claim 4.

9. A foodstuff according to claim 5 containing 100 to 300 ppm of the composition.

10. A foodstuff according to claim 6 containing 100 to 300 ppm of the composition.

11. A foodstuff according to claim 7 containing 100 to 300 ppm of the composition.

12. A foodstuff according to claim 8 containing 100 to 300 ppm of the composition.

13. A process for imparting a cheese flavour to a foodstuff which comprises adding to the foodstuff 50 to 500 ppm by weight of a composition according to claim 1.

14. A process for imparting a blue cheese flavour to a foodstuff which comprises adding to the foodstuff 50 to 500 ppm by weight of a composition according to claim 2.

15. A process for imparting a blue cheese flavour to a foodstuff which comprises adding to the foodstuff 50 to 500 ppm by weight of a composition according to claim 3.

16. A process for imparting a Camembert cheese flavour to a foodstuff which comprises adding to the foodstuff 50 to 500 ppm by weight of a composition according to claim 4.

17. A process according to claim 13 which comprises adding 100 to 300 ppm by weight of the composition.

18. A process according to claim 14 which comprises adding 100 to 300 ppm by weight of the composition.

19. A process according to claim 15 which comprises adding 100 to 300 ppm by weight of the composition.

20. A process according to claim 16 which comprises adding 100 to 300 ppm by weight of the composition.

* * * * *